Feb. 23, 1932.                    I. SIKORSKY                    1,846,367
           AIRCRAFT, WING PANELS, AILERONS, WING BEAMS,
               WING RIBS, AND DETAILS THEREOF
                 Original Filed March 5, 1929      10 Sheets-Sheet 2
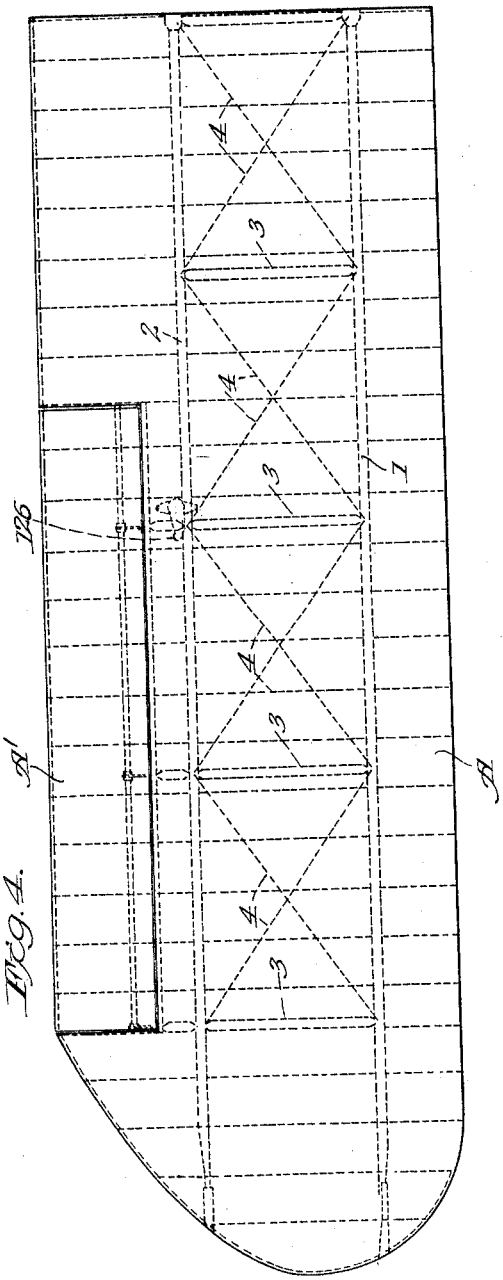
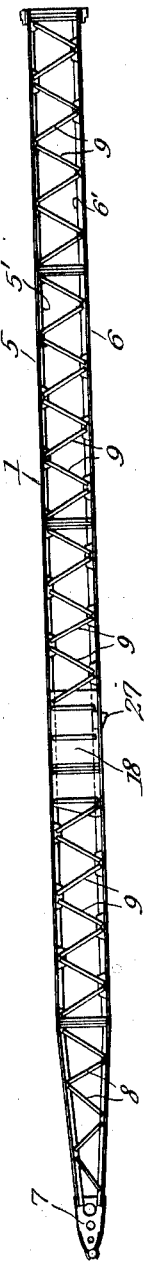
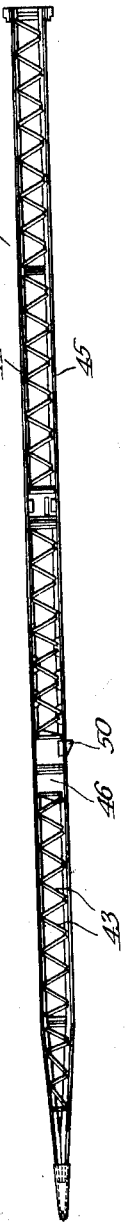

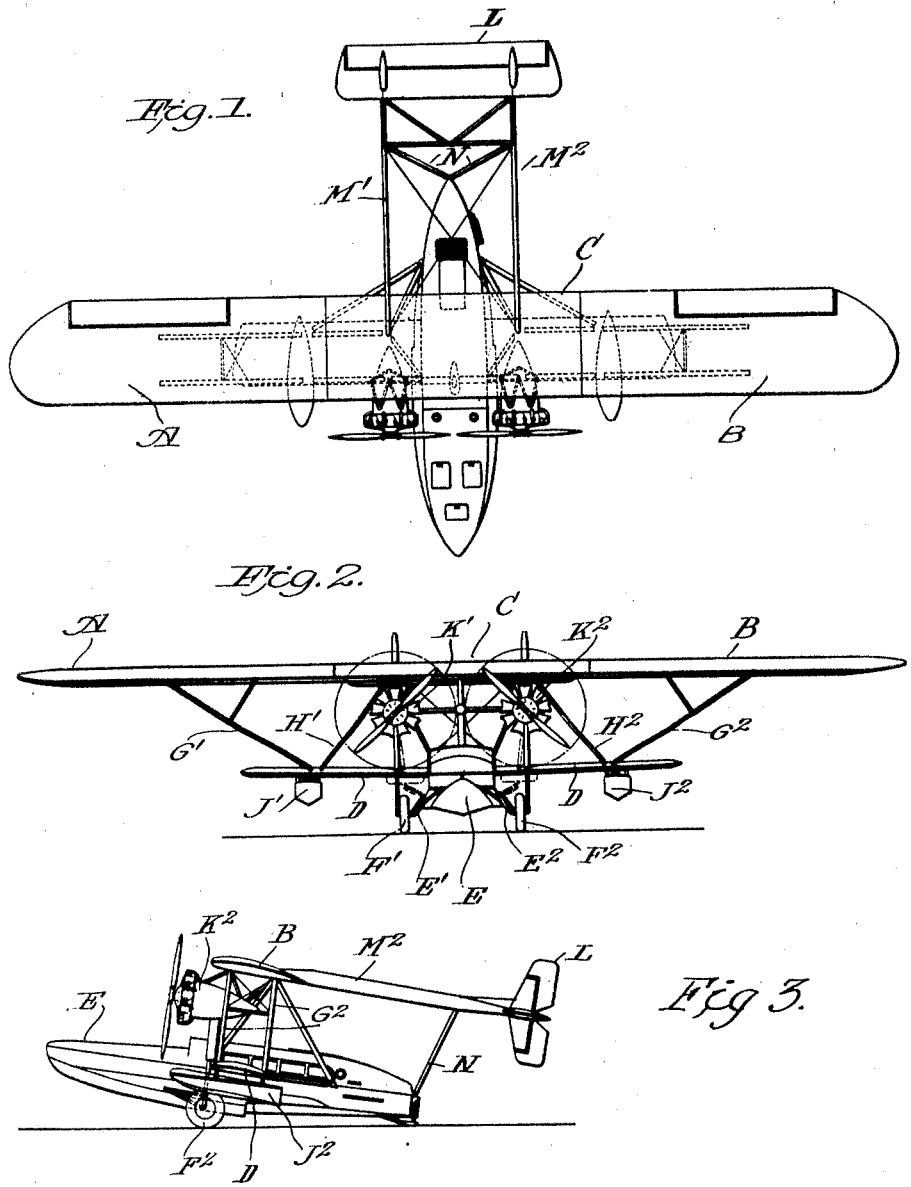

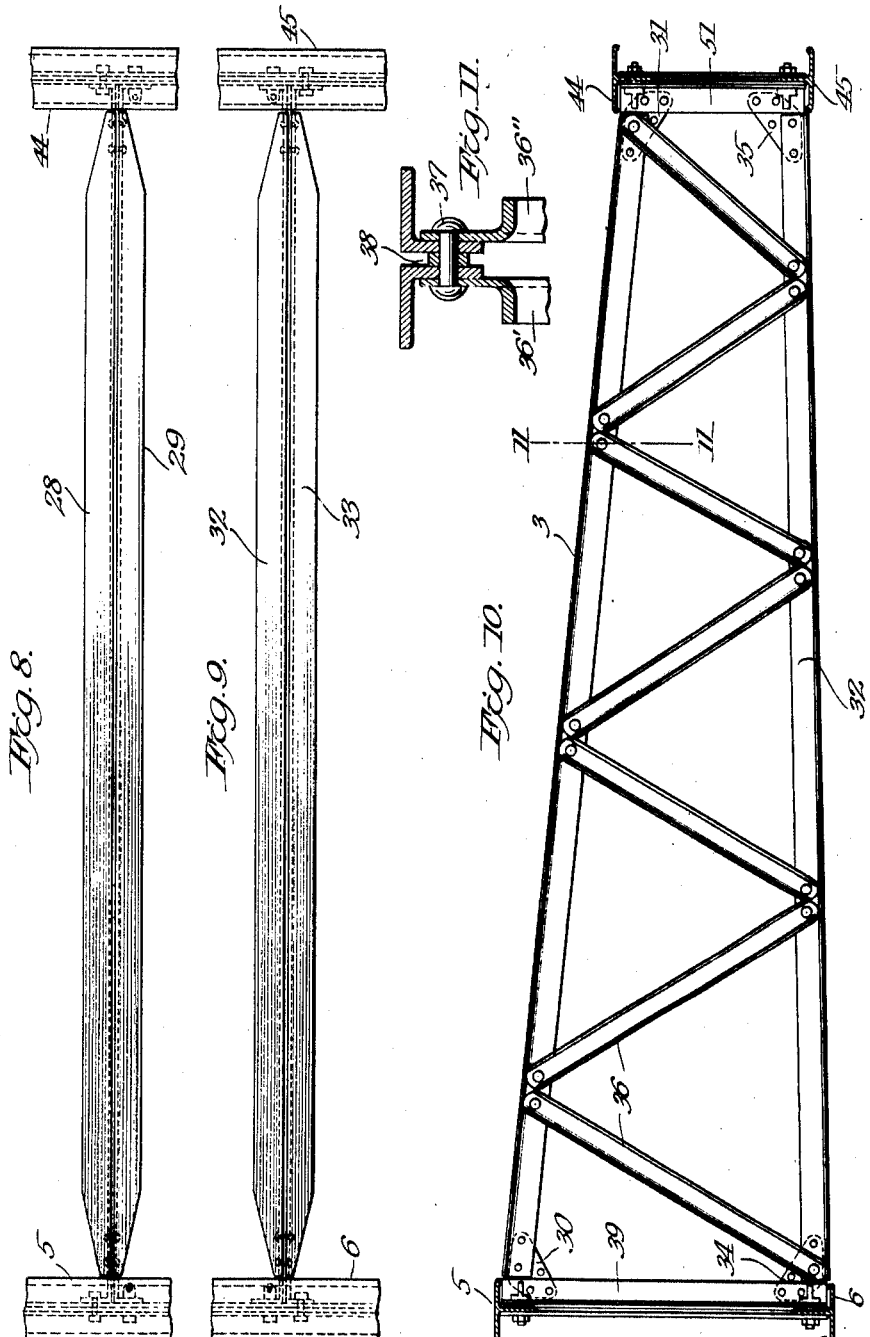

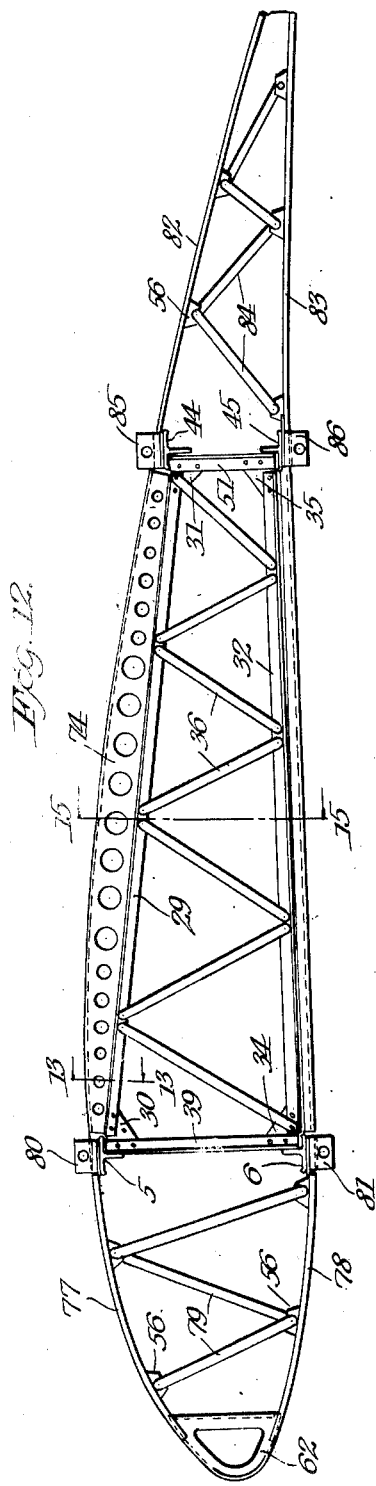

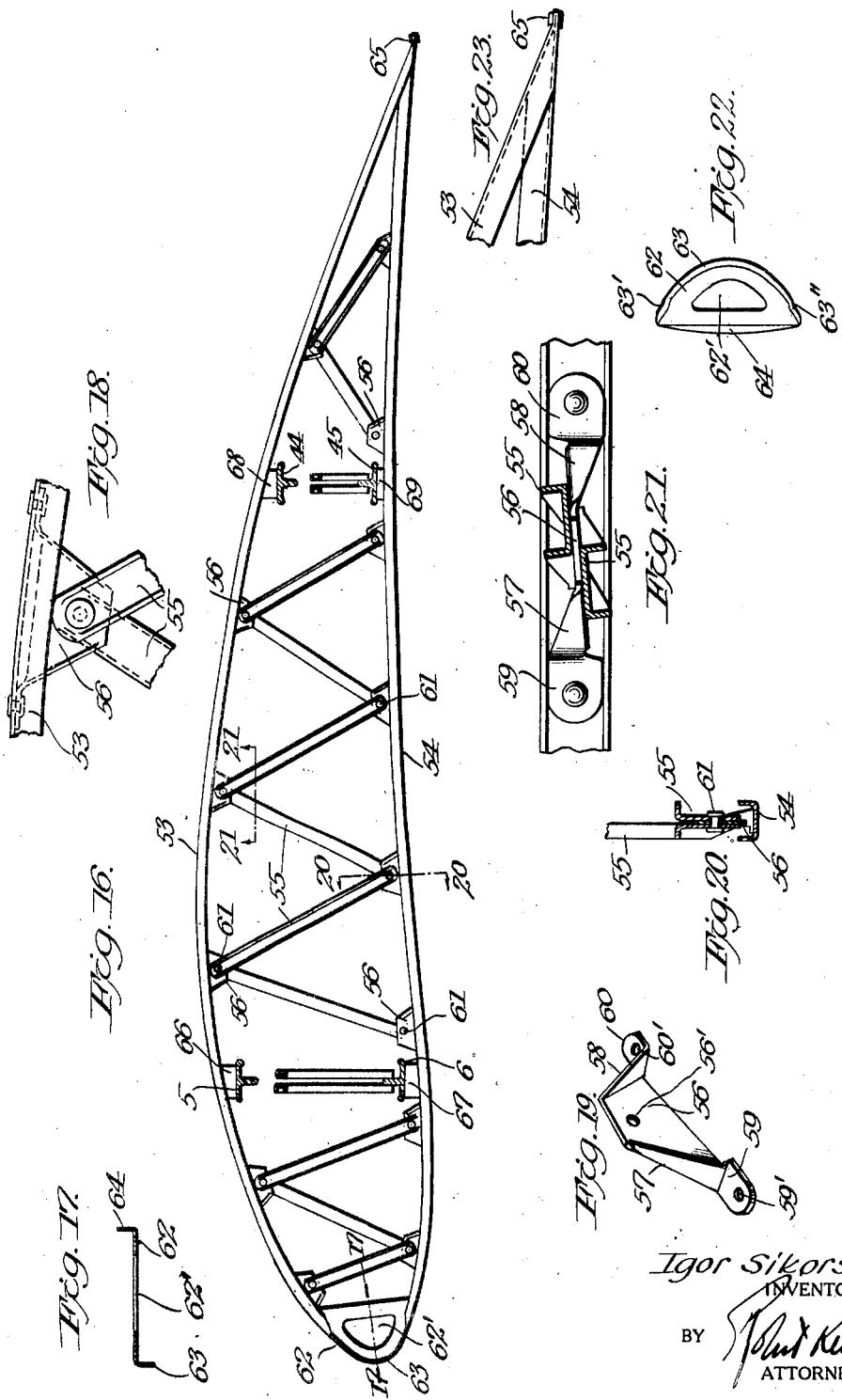

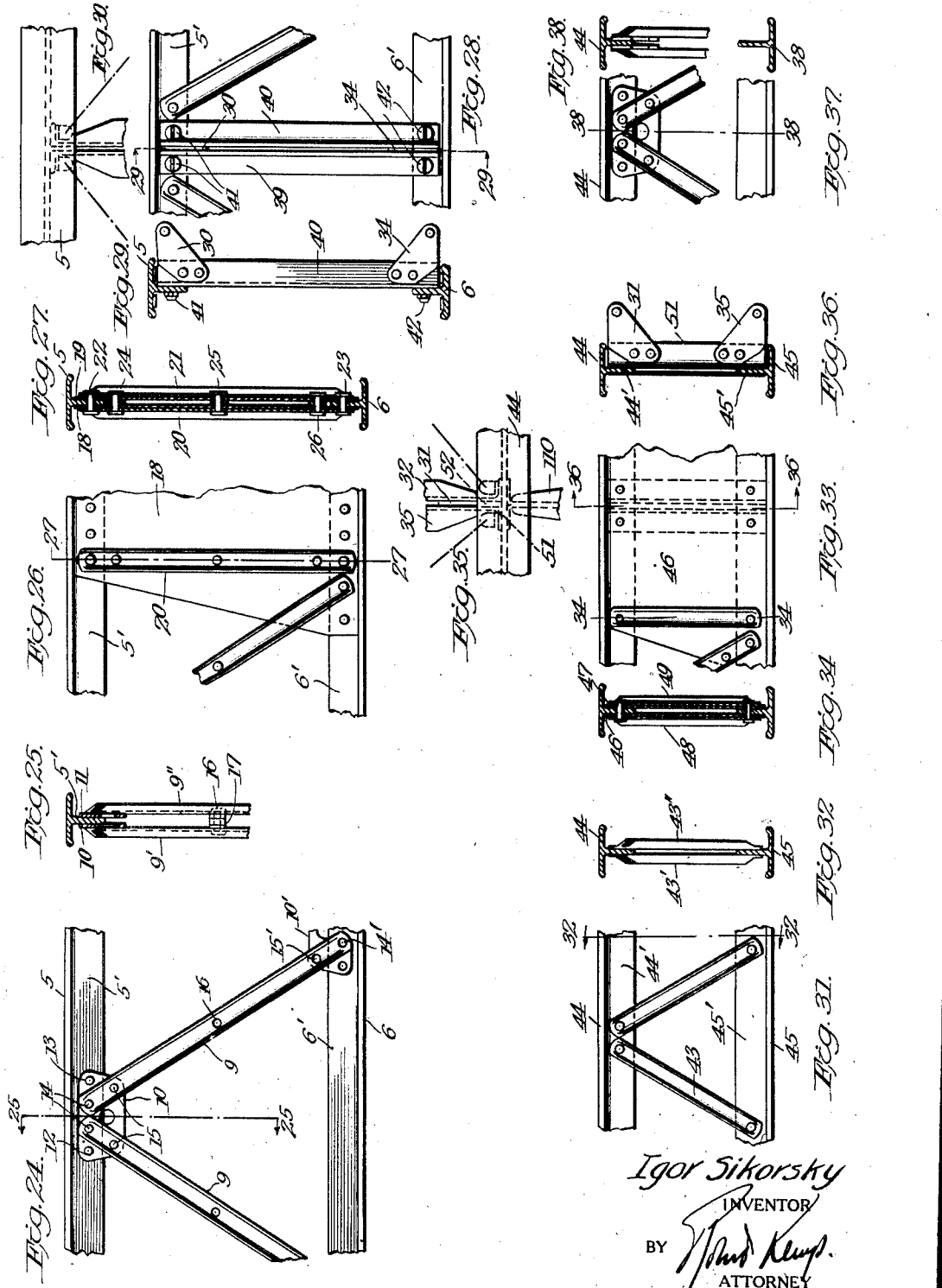

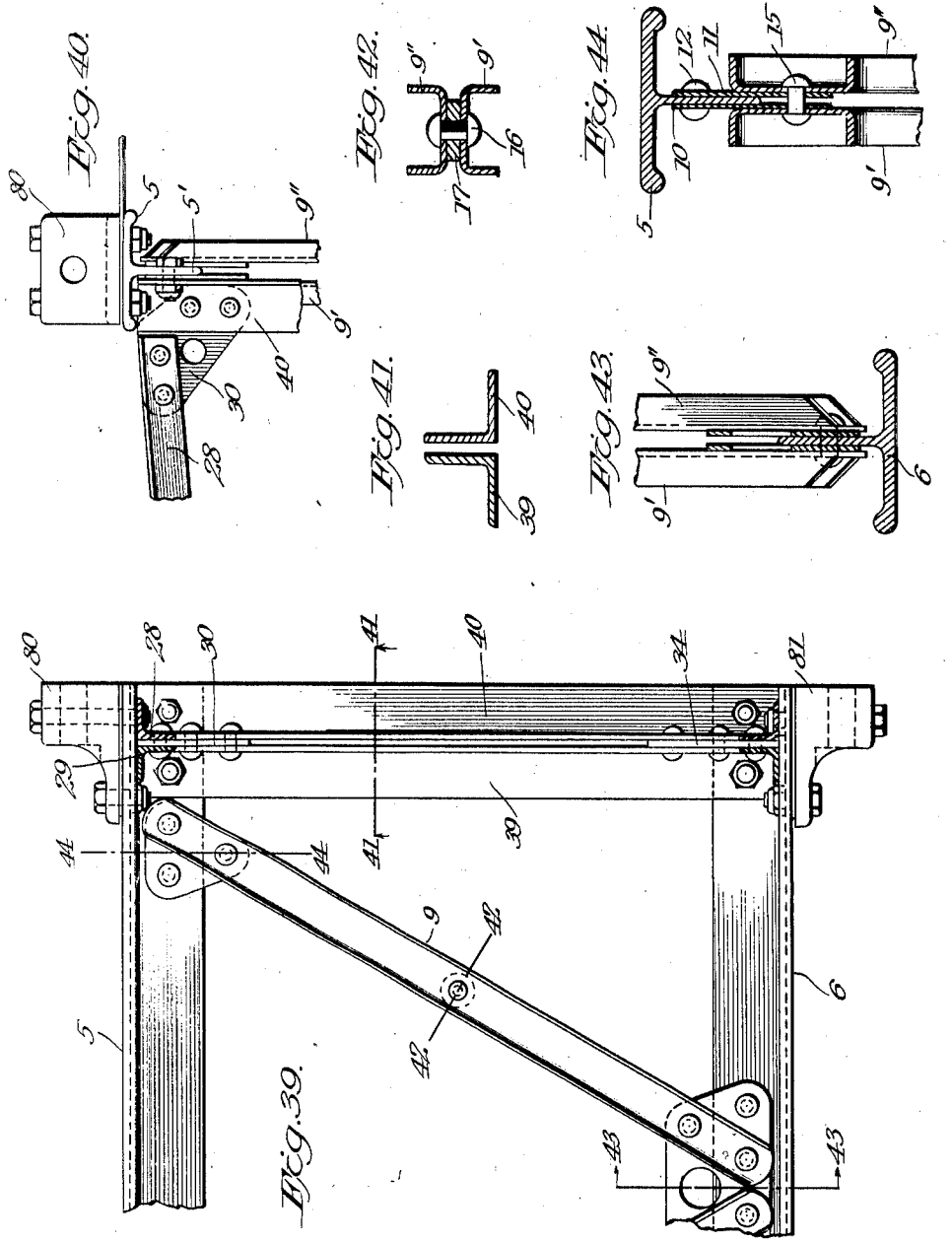

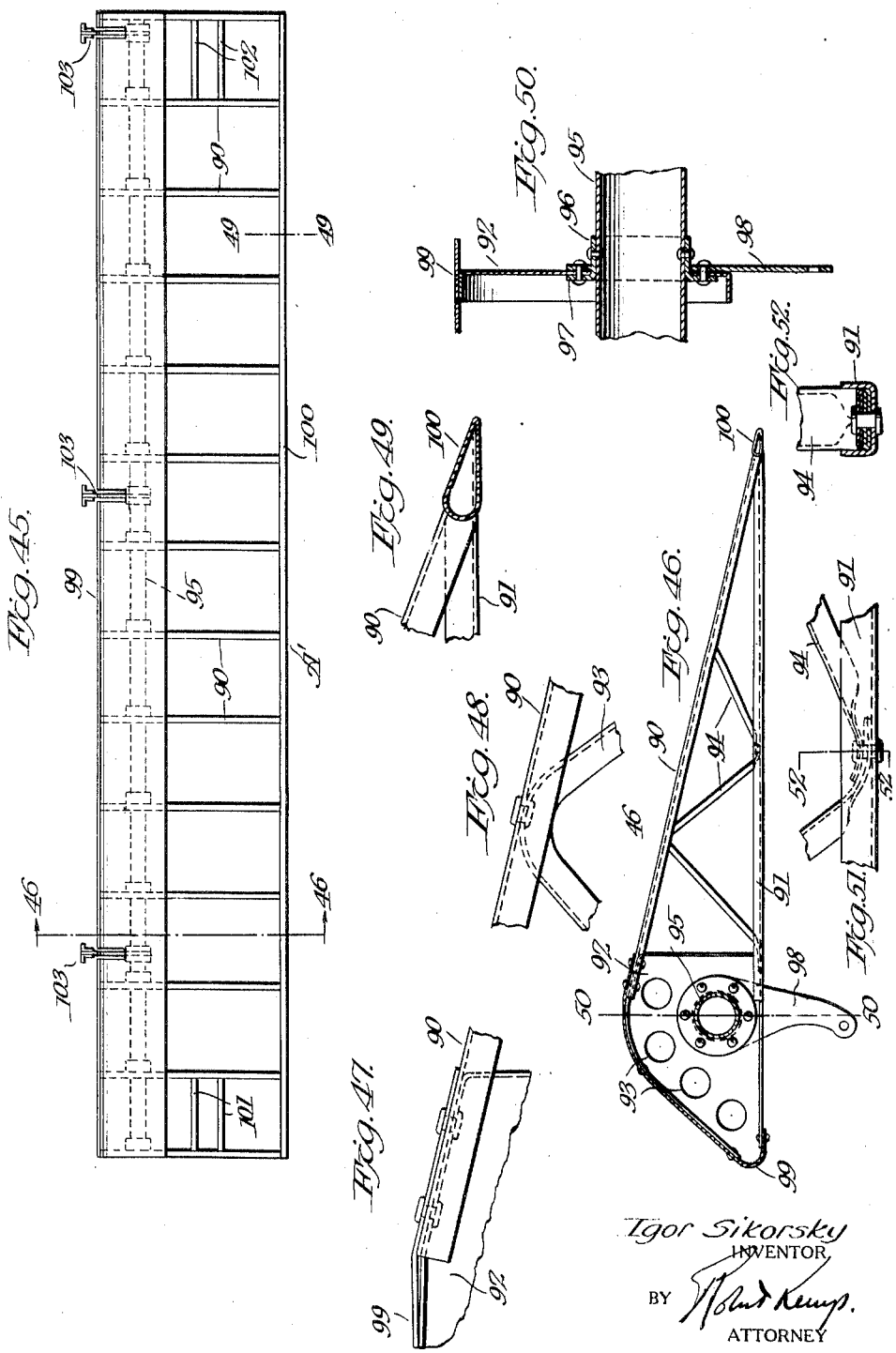

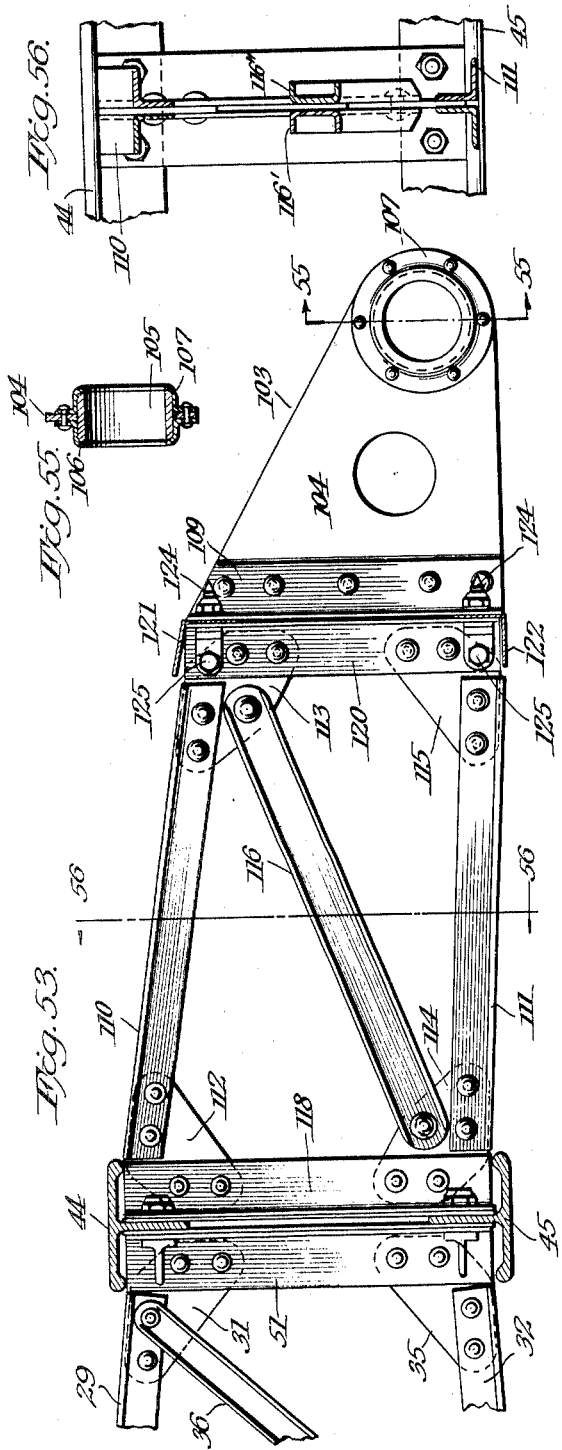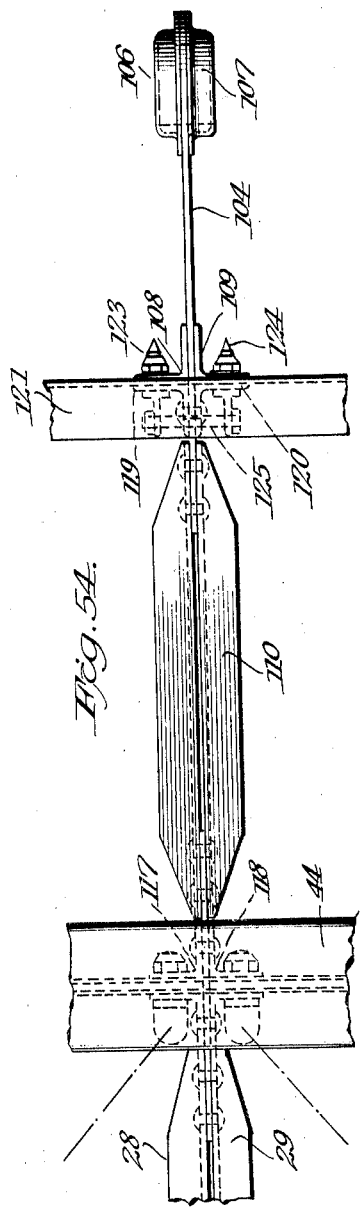

Patented Feb. 23, 1932

1,846,367

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT, WING PANELS, AILERONS, WING BEAMS, WING RIBS, AND DETAILS THEREOF

Application filed March 5, 1929, Serial No. 344,380. Renewed May 12, 1931.

The present invention relates broadly to aircraft and more especially to supporting and/or control surface panels, members of panel frames such as beams and ribs as well as various minor parts of panels and panel members.

The invention further pertains to combinations and sub-combinations of any or all of said above improvements as well as their application to, or their use on, in or in connection with individual aircraft units capable of navigating on the land, water or in the air.

Where the term "aircraft" is used in the present application it includes any form of aerial vehicle capable of navigating through the air.

The prime object of the present invention is to increase the safety and useful life of aircraft.

It proposes a reduction in the weight and overall costs of aircraft panel construction by an economical and efficient distribution of working materials employed mainly in the form of a comparatively small number of standardized parts which can quickly, cheaply and firmly be assembled into a strong, rigid and durable aircraft panel frame structure.

The term "heavier-than-air unit of the land-water-air type" designates a form of aircraft sometimes known as an "amphibian".

Another object of my invention is to meet by means of a safe frame structure, the widely varying and severe stress absorption duties continuously imposed on wing or supporting surface panel frame of amphibian types of aircraft, because when such aircraft are in operation they are apt to alight suddenly either on water or land and while under widely varying speed and load conditions are frequently forced to control in their wing structures dangerous moments of inertia and instantly take care of rapid reversals in weights and forces which are not usually encountered in other types of aerial vehicles capable of alighting on only land or on water. Consequently, the invention will be described with reference to an amphibian.

In the accompanying drawings:

Figure 1 is a plan view of an amphibian.

Figure 2 is a front elevation of the machine of Fig. 1.

Figure 3 is a side elevation of the machine of Fig. 1.

Figure 4 is a plan view of the right hand. main wing of the machine of Fig. 1.

Figure 5 is a front elevation of the front spar of the wing shown in Fig. 4.

Figure 6 is a front elevation of the rear spar of the wing.

Figure 8 is a plan view of a compression member.

Figure 9 is a bottom plan view of the same compression member.

Figure 10 is a transverse section through the front and rear spars of the wing showing in side elevation the compression member of Figs. 8 and 9.

Figure 11 is a section on the line 11—11 of Fig. 10.

Figure 12 shows the structure of the wing according to Fig. 4 as seen from the right of the latter figure.

Figure 13 is an enlarged section on line 13—13 of Fig. 12.

Figure 14 is an enlarged view of a portion of the compression member assembly of Fig. 12.

Figure 15 is a section on line 15—15 of Fig. 12.

Figure 16 is a side elevation of a wing rib.

Figure 17 is a section on line 17—17 of Fig. 16.

Figure 18 is an enlarged view showing structural details of the rib of Fig. 16.

Figure 19 shows in perspective, a connector plate involved in the construction of the rib of Fig. 16.

Figure 20 is a section on line 20—20 of Fig. 16.

Figure 21 is a section on line 21—21 of Fig. 16.

Figure 22 shows in perspective a nose plate.

Figure 23 is an enlarged view of the trailing edge of the rib.

Figure 24 is a side elevation of a portion of the front wing spar.

Figure 25 is a section on line 25—25 of Fig. 24.

Figure 26 is a side elevation of another portion of the front wing spar.

Figure 27 is a section on line 27—27 of Fig. 26.

Figure 28 is a side elevation of still another portion of the front wing spar.

Figure 29 is a section on line 29—29 of Fig. 28.

Figure 30 is a plan view of a portion of the front wing spar and the adjacent portion of a compression member.

Figure 31 is a side elevation of a portion of the rear wing spar.

Figure 32 is a section on line 32—32 of Fig. 31.

Figure 33 is a side elevation of another portion of the rear wing spar.

Figure 34 is a section on line 34—34 of Fig. 33.

Figure 35 is a partial plan view of the structure shown in Fig. 33.

Figure 36 is a section on line 36—36 of Fig. 33.

Figure 37 is a side elevation of still another portion of the rear wing spar.

Figure 38 is a section on line 38—38 of Fig. 37.

Figure 39 is a side elevation of the inner end of the front spar of the left wing.

Figure 40 is an elevation of the upper portion of the wing spar as seen from the right of Fig. 39.

Figure 41 is a section on line 41—41 of Fig. 39.

Figure 42 is a section on line 42—42 of Fig. 39.

Figure 43 is a section on line 43—43 of Fig. 39.

Figure 44 is a section on line 44—44 of Fig. 39.

Figure 45 is a plan view of the aileron shown in Fig. 4.

Figure 46 is a section on line 46—46 of Fig. 45.

Figure 47 is an enlarged view of a portion of the rib shown in Fig. 46.

Figure 48 is an enlarged view of another portion of the rib.

Figure 49 is a section on line 49—49 of Fig. 45.

Figure 50 is a section on line 50—50 of Fig. 46.

Figure 51 is an enlarged view of a still further portion of the rib of Fig. 46.

Figure 52 is a section on line 52—52 of Fig. 51.

Figure 53 is a side elevation of the supporting means for the aileron.

Figure 54 is a plan view of the supporting means shown in Fig. 53.

Figure 55 is a section on line 55—55 of Fig. 53, and

Figure 56 is a section on line 56—56 of Fig. 53.

Figure 7:
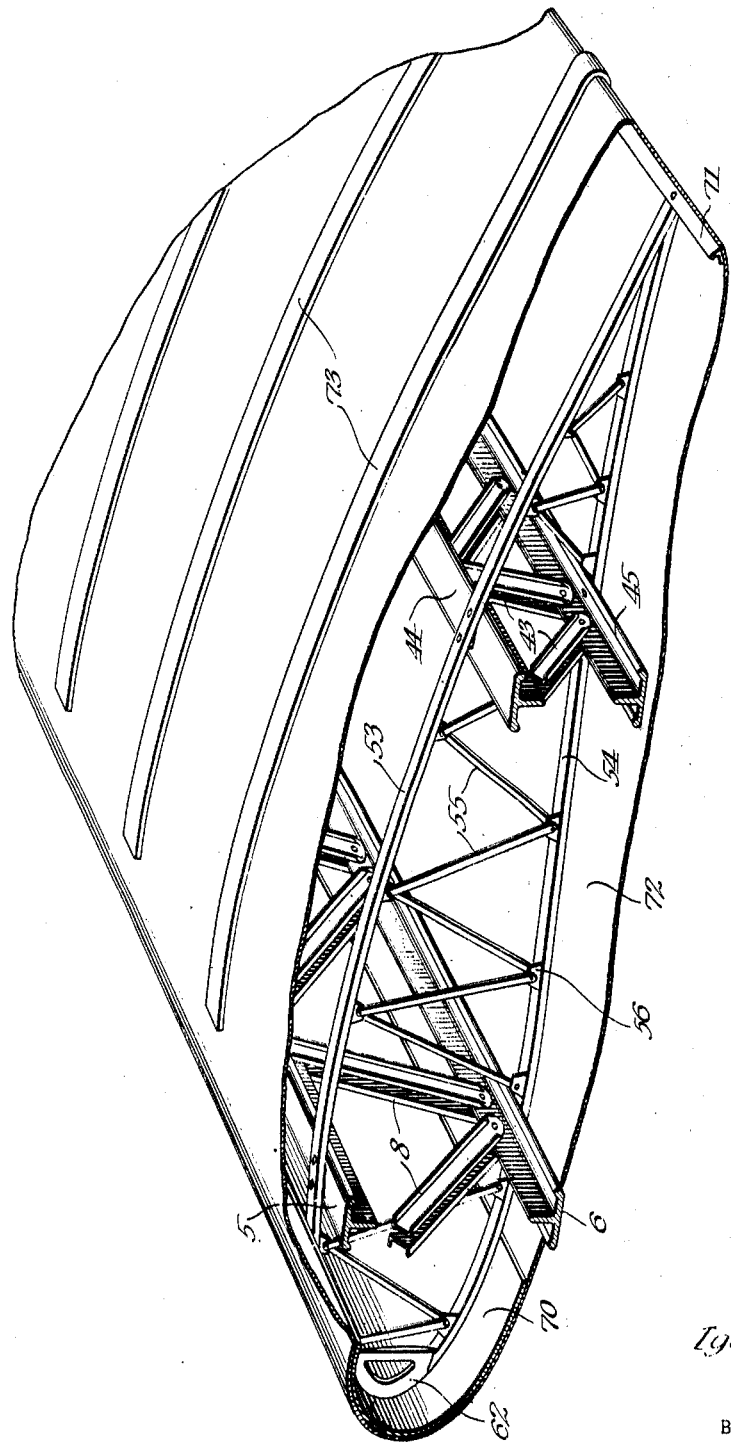
Figure 7 is a perspective of a portion of the wing with parts broken away and parts in section.

Referring first to Figs. 1 to 3 of the drawings, the main plane is shown as consisting of right and left wings A and B, and a center plane C, while a lower plane is indicated at D. A body boat E is disposed intermediate the right and left hand portions of lower wing D and has pivoted thereto brackets E' and E² supporting retractable landing wheels F' and F². Since the control mechanism for the landing wheels has been fully described in my prior application, Serial No. 354,552, filed April 12, 1929, its particular description is not required here.

The upper and lower planes are connected by means of main interplane struts G', G², H' and H², while beneath the lower plane are suspended floats J' and J². Propulsion units K' and K² are supported intermediate the planes in symmetrical relation to the body boat E.

An empennage assembly L is supported at the ends of out-riggers M' and M² which extend rearwardly from center plane C, struts N connecting the rear ends of the out-riggers to the rear end of body boat E.

Figure 4 is a plan view of main wing A having mounted in its trailing portion aileron A' which is controlled in the well known manner. In dotted lines are indicated the front spar 1, rear spar 2, compression members 3 and bracing wires 4.

The front spar 1 is shown in elevation in Fig. 5, constructional details being shown in Figs. 25 to 30 and 39 to 44 particularly. The spar comprises top and bottom bulb-flanged T-members 5 and 6, the webs 5' and 6' of the T-members being faced toward each other and lying in the same planes. At its outer extremity, the spar is tapered off and terminates in a suitably formed end plate 7. Members 5 and 6 are connected together and maintained in rigid spaced relation by series of truss members as at 8 and 9.

Referring to Figs. 24 and 25, it will be noted that a pair of plates 10 and 11 are secured in registering relation to opposite sides of the web 5' of member 5 by means of rivets 12 and 13. Similar pairs of plates are secured to the web 6' of lower member 6, the plates on the two members being in staggered relation as is clear from the drawings. Each truss unit 9 is composed of a pair of U-members 9' and 9" in back to back relation, Fig. 25, whose ends overlie pairs of upper and lower connector plates 10 and 10'. The upper ends of members 9' and 9" are secured together through plates 10 and 11 and web 5' by means of a rivet or bolt 14, while at a longitudinally spaced point the members are secured together again through plates 10 and 11 by means of a rivet 15. The lower ends are similarly connected to the lower connector plates by means of rivets 14' and 15'. The medial portions of U-members 9' and 9" are secured together by means of a rivet 16 which passes through spacer 17, Fig. 25.

The described manner of connecting the double truss members to the double connector plates by the double fastening means gives an extremely rigid structure without impairing the strength of the T-members by a large number of rivet holes.

At the outer tip of the spar, Fig. 5, I have shown the T-members connected together by means of truss units 8 without the intermediary of the connector plates. It will be noted from Fig. 2 that the strut G' is interposed between plane A and right hand plane D. The strut G', visible in Fig. 2, connects the front spar of wing A with the front spar of wing D, while a second strut G', which is not visible in Fig. 2, connects the rear spars of the two wings.

In order to render the portion of spar 1, to which the upper end of strut G' is secured, extremely rigid, this portion is reinforced by means of a pair of plates 18 and 19, Figs. 26 and 27, riveted together through their upper and lower margins through webs 5' and 6'. As a further reinforcement, U-members 20 and 21 are disposed in parallel relation on the outer faces of the plates and secured thereto by means of rivets 22 and 23 passing likewise through the T-member webs, and rivets 24, 25, and 26 passing through spacing elements disposed between the plates. Anchor member 27, Fig. 5, for the upper end of strut G' is fixed to plates 18 and 19.

At suitable intervals, compression members 3 are interposed between front and rear spars 1 and 2. The compression members, Figs. 8, 9, 10 and 11 comprise upper and lower longitudinal members, the upper longitudinal member being composed of a pair of L-members 28 and 29 placed back to back and having secured between them at their ends projecting tongues 30 and 31.

The lower longitudinal member is composed of L-members 32 and 33 placed back to back and having secured between their ends projecting tongues 34 and 35. These upper and lower longitudinal members are interconnected by means of truss units 36, each composed preferably of two U-members 36' and 36" disposed back to back and secured to the L-member flanges as by rivets 37 passing through spacers 38, Fig. 11.

At suitable intervals, L-members 39 and 40, Figs. 28 to 30, are secured in back to back relation to webs 5' and 6' on the rear sides of the latter in perpendicular relation to the T-members, by means of eye bolts 41 and 42. The projecting ends of tongues 30 and 34 are secured between the ends of members 39 and 40, eye bolts 41 and 42 serving as anchoring means for the bracing wires.

Figs. 31 and 32 show the trussing employed at the outer end of rear spar 2, each truss unit 43 comprising U-members 43' and 43" secured at their ends to upper and lower T-members 44 and 45, specifically to the flanges 44' and 45' of the latter. At the point of connection of rear strut G', the spar is additionally reinforced by plates 46 and 47, and U-members 48 and 49 substantially as described with reference to Figs. 26 and 27, an anchor member 50, Fig. 6, being secured to plates 46 and 47. In Figs. 37 and 38, the use of connector plates for connecting the T-members and truss units of the rear spar is shown, and this structure will be readily understood if reference is had to the above description of Figs. 24 and 25.

L-members 51 and 52, Figs. 35 and 36, are attached to the front faces of flanges 44' and 45' at points exactly opposite L-members 39 and 40, Fig. 28, and tongues 31 and 35 are riveted between them, thus completing the wing panel structure.

The details of the rib structure may be most clearly seen from Figs. 7 and 16 to 23. In Fig. 16, 53 and 54 are top and bottom contour strips of U-section, the channels of these U-members being faced toward each other.

In Fig. 19, I have shown in perspective a connector plate through the intermediary of which the U-section truss members 55 are secured to strips 53 and 54. The main body of the connector is in the form of a tapered plate 56 having similarly tapered flanges 57 and 58 extending in opposite directions from opposite sides thereof. Flanges 57 and 58 terminate in feet 59 and 60, which lie in the same plane, and are provided with perforations 59' and 60' through which they may be secured to the contour strips. As will be evident from Fig. 16, the connectors 56 are secured within the channels of the top and bottom contour members in staggered relation, two truss members being secured to each connector by means of a rivet 61 joining the ends of the truss members through aperture 56' of plate 56, the truss members forming a V at each connector.

Fig. 22 shows in perspective a nose plate which is adapted to be secured between the forward ends of the contour strips. The nose plate consists of a light metal stamping 62 having a curved forward edge flanged in one direction, as at 63, and a rectilinear rearward edge flanged in the opposite direction, as at 64, and for the sake of lightness, the plate is provided with a cut-out or lightening hole 62'. The rear sections of flange 63 are inwardly stepped, as at 63' and 63", upon which the cross portions of the ends of members 53 and 54 are riveted in flush relation to the intermediate portion of flange 63. The trailing ends of strips 53 and 54 are secured together as by a rivet 65.

The described rib is adapted to be slipped over the front and rear spars and through the intermediary of fitting blocks 66, 67, 68 and 69 secured to T-members 5, 6, 44 and 45.

As shown in Fig. 7, a box 70 surrounds and connects the rib noses and a V-channel 71 connects the trailing ends of the ribs. A wing covering 72 of suitable material covers the whole, this covering being preferably secured to the ribs through reinforcing strips 73 which register with the ribs.

The compression member described with reference to Figs. 8 to 11 is shown in Figs. 12 to 15 as constituting the medial portion of a built-up rib. According to these figures, a contour piece 74 of U-section is secured, as by spot-welding, to L-member 29, and a U-member 75 is secured to L-member 32 through the intermediary of spacers 76 so proportioned as to give member 75 the desired curve. These contour pieces serve to fill out the compression member and transform its rectilinear faces into faces having the proper contours.

The nose portion of the rib, whose medial portion is constituted by the thus modified compression member, consists of contour strips 77 and 78 trussed by means of members 79 through the intermediary of connector plates 56 and supporting at their forward ends nose plates 62. The rear flattened ends of strips 77 and 78 are secured across T-members 5 and 6 in alignment with the compression member by means of connector blocks 80 and 81, through the intermediary of which the wing is adapted to be bolted to the center plane structure (see Figs. 39 and 40).

A trailing rib section has U-section contour strips 82 and 83 interconnected by truss members 84 and plates 56. The forward flattened ends of the contour strips 82 and 83 are secured respectively to T-members 44 and 45 in alignment with the compression member through the clamping action of connector blocks 85 and 86.

In Figures 45 to 52, I have shown the structural design of aileron A'. The rib structure as a whole, is most clearly illustrated in Fig. 46. Referring to this latter figure, 90 and 91 are upper and lower U-section contour strips secured together at their rear ends and having their forward ends secured to a peripherally flanged nose plate or web 92. The flanges of the nose plate are preferably continuous except at the extreme forward tip, where, for the sake of convenience in manufacture, they may be interrupted for a space. The upper and lower flanges are stepped inwardly slightly at their rear ends so as to receive in flush relation, the forward ends of members 90 and 91. For the sake of lightness, the nose plate is provided with a number of cutouts 93.

Truss members 94 of U-section have their flattened ends overlapped and riveted to the contour members, Figs. 51 and 52. The forward member 94 may conveniently be in the form of a V with its apex secured to member 90 as particularly shown in Fig. 48.

A tubular member 95 is passed through aligned apertures in the nose plates of a series of ribs and secured thereto through the intermediary of collars 96 having radial flanges 97, adapted to overlie the margins of the nose plate apertures. A control arm 98 has an attachment portion provided with a circular aperture adapted to receive a collar 96, the attachment portion being secured by means of rivets to flange 97 through the associated nose plate 92.

The ribs thus mounted have their leading edges connected by means of a nose box 99 and their trailing edges connected by means of a strip 100. Compression members 101 and 102 are interposed between the end ribs and the next adjacent ribs.

During the assembly of the ribs on member 95, hanger brackets 103 are also strung on member 95 at appropriate intervals, these brackets projecting forwardly of the ribs through suitable slots in nose box 99. The hanger brackets are indicated in Figs. 4 and 45, but appear most clearly in Figs. 53 to 55. As may be seen from the latter figures, each bracket consists of a substantially triangular plate 104 having an aperture in one apex in which is secured a bushing 105 by means of flanged ferrules 106 and 107. The margin of plate 104 opposite bushing 105 is secured between a pair of L-members 108 and 109.

For supporting the hanger brackets and ailerons, I provide frames as shown in Figs. 53, 54 and 56. These frames comprise upper and lower longitudinal units 110 and 111, each consisting of a pair of L-members disposed back to back, and having secured between their respective ends tongues 112, 113, 114 and 115. Tongues 113 and 114 have secured thereto a diagonal unit 116, consisting of a pair of U-members 116' and 116" in back to back relation, one being disposed at each side of the tongues.

The projecting ends of tongues 112 and 114 are secured between a pair of L-members 117 and 118, whose ends are secured to spar members 44 and 45 by means of the same eye-bolts which secure L-members 51 and 52 to the spar members. It is thus evident that in the preferred construction, the aileron supporting frames are in alignment with wing compression members.

The projecting ends of tongues 113 and 115 are secured between the ends of L-members 119 and 120, and angle strips 121 and 122 join the upper and lower ends of these members of all the aileron supporting frames.

Eye-bolts 123 and 124 connect L-members 108 and 119 and 109 and 120 through angle strips 121 and 122. Bolts 125 are passed through the eyes of opposite eye-bolts and through the webs of L-members 119 and 120, and thus prevent any displacement of the eye-bolts.

The control arm 98 of the aileron thus mounted, may be conveniently linked to the operating lever indicated at 126, Fig. 4.

A wing constructed in accordance with the above description may be readily assembled, and will have in a large degree the desirable characteristics of lightness and strength. It is to be understood that I do not necessarily confine myself to the details of construction exactly as shown and described, the scope of the invention being determined in the following claims.

I claim:

1. A metallic wing rib for aircraft, said rib comprising a flanged nose web, the edges of said nose web flanged in opposite directions, flanged upper and lower contour members having U-shaped sections with flanges facing each other, said members each being attached at one end to said nose web and being connected to each other at their other end, connector plates provided with flanged edges facing in opposite directions, said connector plates fastened along said upper and lower contour members of said rib between the flanges of said contour members and spaced in alternate arrangement to each other and a truss composed of flanged members having U-shaped sections positioned between said contour members with alternate flanges facing in opposite directions, the ends of said truss members connected to said connector plates.

2. In an aircraft wing, front and rear spar elements, each of said elements comprising top and bottom T members interconnected by truss members secured to the T member webs; and rib elements each comprising top and bottom U-section contour strips crossing the spars to the outside of the latter and secured thereto, connector plates secured to the inner faces of said strips, the plates on the upper strip being staggered relative to those on the lower strip, and U-section truss members secured at their ends to said plates and to each other.

3. In an aircraft wing, front and rear spar elements, each of said elements comprising top and bottom T members, and a series of truss units connecting said members, each of said units comprising a pair of U-section truss members arranged back to back and connected at their ends to each other and to the T member webs; and rib elements each comprising top and bottom U-section contour strips crossing the spars to the outside of the latter and secured thereto, connector plates secured to the inner faces of said strips, the plates on the upper strip being staggered relative to those on the lower strip, and U-section truss members secured at their ends to said plates and to each other.

4. In an aircraft, a wing including a spar comprising a pair of spaced T members with their webs faced and in the same planes, truss members interconnecting the T member webs, connector blocks fixed to the outside of said T members at one end of the spar, and contour strips having portions secured between said blocks and T members.

5. In an aircraft, a wing including a spar comprising a pair of spaced T members with their webs faced and in the same planes, truss members interconnecting the T member webs, connector blocks fixed to the outside of said T members at one end of the spar, and a rib nose frame including contour strips with their rear ends secured between said blocks and T members.

6. In an aircraft, a wing including front and rear spars each comprising top and bottom T members with interconnecting truss members; and a compression member comprising top and botom longitudinal members each comprising a pair of back to back L members, truss members interconnecting the longitudinal members, tongues secured between the ends of the associated L members and projecting therebeyond; and a pair of back to back L members extending directly between the top and bottom members of each spar, the projecting ends of said tongues being secured between said last named pairs of L members.

7. In an aircraft, a wing including front and rear spars each comprising top and bottom T members with interconnecting truss members; and a compression member comprising top and bottom longitudinal members each comprising a pair of back to back L members, truss members interconnecting the longitudinal members, tongues secured between the ends of the associated L members and projecting therebeyond; a pair of back to back L members extending directly between the top and bottom members of each spar, the projecting ends of said tongues being secured between said last named pairs of L members, and contour pieces disposed along the outer faces of said compression member.

8. An amphibian aircraft including in its construction the combination of a body-boat, a wing extending above and across said body-boat and connected thereto, retractable landing gear hingedly mounted on said body-boat and connected to said wing, said wing having a wing panel including a metallic front wing spar comprising a pair of bulb flanged T-members positioned with their central flanges facing each other and spaced apart by flanged truss members having U-shaped sections, a rear wing spar also comprising a pair of bulb flanged T-members positioned with their central flanges facing each other and spaced apart by flanged truss members having U-shaped sections said truss members in both front wing spar and rear wing spar being arranged in pairs and placed back to back with their flanges facing away from each other, compression members positioned between and connecting said front wing spar and said rear wing spar said compression members including trusses of web members having U-shaped sections, means associated with said front wing spar for connecting said spar to an adjacent aircraft member, means associated with said rear wing spar for connecting said rear spar to an adjacent aircraft member, compression members carried by said rear wing spar for hingedly mounting an aileron thereon and an aileron attached to said compression members last named through brackets hingedly connected to said aileron.

9. In an aircraft, a rib comprising separate relatively fixed nose, medial and trailing sections, each of said sections comprising interconnected bounding strips, the bounding strips of the medial section comprising mated angle bars having rectilinear outer faces and contour pieces of U-shaped transverse cross section extending along and secured to said rectilinear faces, and defining the camber of the wing surface in said medial section.

10. In an aircraft, a rib comprising separate relatively fixed nose, medial and trailing sections, each set of sections comprising respective bounded strips interconnected by means of truss members, the medial section being a compression member, the bounding strips of said medial section having rectilinear outer faces, and contour pieces extending along and secured to said rectilinear faces, and defining the camber of the wing surface in said medial section.

Signed at College Point, Long Island, in the county of Queens and State of New York, this 21st day of December, A. D. 1928.

IGOR SIKORSKY.